(12) United States Patent
Brown

(10) Patent No.: US 6,352,582 B1
(45) Date of Patent: Mar. 5, 2002

(54) COMPOSITION AND PROCESS FOR TREATING HARD SURFACES

(75) Inventor: Colin W. Brown, Milwaukee, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 09/529,891

(22) PCT Filed: Oct. 22, 1998

(86) PCT No.: PCT/US98/22210

§ 371 Date: Apr. 20, 2000

§ 102(e) Date: Apr. 20, 2000

(87) PCT Pub. No.: WO99/20704

PCT Pub. Date: Apr. 29, 1999

(30) Foreign Application Priority Data

Oct. 22, 1997 (GB) ............................................ 9722321

(51) Int. Cl.$^7$ .............................. C09G 1/04; C09G 1/16
(52) U.S. Cl. .................. 106/3; 106/287.13; 106/287.14
(58) Field of Search ................................ 106/3, 287.13, 106/287.14

(56) References Cited

U.S. PATENT DOCUMENTS

| | | | | | |
|---|---|---|---|---|---|
| 4,218,250 A | * | 8/1980 | Kasprzak | .......................... | 106/3 |
| 4,936,914 A | * | 6/1990 | Hurley et al. | ................... | 106/3 |
| 5,531,814 A | * | 7/1996 | Bahr et al. | ...................... | 106/3 |

FOREIGN PATENT DOCUMENTS

| | | | |
|---|---|---|---|
| FR | 7924061 | * | 4/1980 |
| WO | WO-92/00288 | * | 1/1992 |

* cited by examiner

Primary Examiner—C. Melissa Koslow

(57) ABSTRACT

An emulsion polish that includes a non-volatile silicone fluid, a liquid polyether siloxane immiscible with water and the silicon fluid, and a surfactant to stabilize the emulsion. The polyether siloxane has a specific gravity less than that of the silicone fluid. A process for treating a hard surface with such a polish is also disclosed.

20 Claims, No Drawings

COMPOSITION AND PROCESS FOR TREATING HARD SURFACES

TECHNICAL FIELD

The present invention relates to a composition for treating hard surfaces to change the behaviour of dust which is deposited on to the surfaces, and to a process using the composition.

BACKGROUND ART

Various compositions containing silicones have been proposed for treating hard surfaces, in particular furniture, in order to modify the appearance of the surfaces, in particular to polish the surfaces. Current furniture polishes based on silicones operate by leaving a mobile layer of silicone fluid (or a combination with waxes and oils). Dust will settle out on furniture when furniture is exposed to the atmosphere in rooms. When dust settles on a mobile layer of silicone fluid it will remain on the surface of the silicone for a considerable time. The length of time the dust remains on the surface will depend on the viscosity of the silicone fluid in the original polish. Silicone fluids of viscosities of 20 centistokes or more are commonly used in furniture polishes and with such fluids the dust may remain on the surface for hours. When the film of silicone fluid is only a few micrometres thick the surface dust is available for redistribution into the atmosphere. Furthermore, the dust is composed of many different components, both hydrophilic and hydrophobic. The hydrophilic material may remain on the surface even when the hydrophobic material has sunk into the silicone.

It is often desirable for furniture polishes to have anti-static properties, usually in the form of enhanced surface electrostatic charge dissipation which also reduces the attraction of dust to the surface. There are numerous ways of doing this. It is thus known to provide products for treating furniture which contain an anti-static material to reduce the tendency of a surface to attract dust. However, such products are concerned with reducing the accumulation of dust on the surface rather than with modifying the behaviour of the dust after it has settled on the surface.

Polished surfaces are often dry-dusted (i.e. dust is removed with a dry dusting cloth or other dry implement) between applications of polish and the dusting procedure may cause dust on the treated surface to be redistributed in the atmosphere. Some of the components of the dust have very small particle sizes, e.g. less than 10 micrometres in diameter, and have an increased probability of being released into the atmosphere and of remaining in the atmosphere for a significant period of time. These components include pollen grains, mould spores, and faecal matter from dust mites. These components can produce an allergic reaction when respired by humans if present at sufficiently high concentrations.

U.S. Pat. No. 5,112,394 discloses a furniture polish concentrate which contains a silicone fluid (dimethyl silicone) and a siloxane copolymer containing a poly(ethoxy) chain, which copolymer acts as an emulsifier. The two components form separate layers when applied to a lacquered furniture surface. The dimethyl silicone forms the upper layer and the copolymer, which has a greater specific gravity, forms an underlying layer. The behaviour of dust on the treated surface is not discussed.

While it may be desirable to minimize the deposition of dust on a surface it has now been found that it is desirable to provide silicone-containing compositions which can bind at least certain dust components more firmly to the treated surface and that it may be desirable to agglomerate certain components of the dust.

DISCLOSURE OF INVENTION

According to one aspect of the present invention, an emulsion polish comprising a non-volatile silicone fluid, a liquid polyether siloxane which is immiscible with water and the silicone fluid, and a surfactant to stabilize the emulsion is provided wherein the polyether siloxane has a specific gravity which is less than that of the silicone fluid.

When the emulsion is applied to a surface, it is broken by wiping with a cloth or the like, as is conventional with emulsion furniture polishes. The polyether siloxane migrates to the surface carrying with it any dust which settles immediately after the application of the emulsion. When separation is complete, any dust settling on the surface will tend to agglomerate and to be drawn into the surface layer of the polyether siloxane within a short time compared with many hours when the surface layer is a silicone fluid.

The present invention is particularly useful for the treatment of hard surfaces in rooms, i.e. enclosed habitable spaces where dust deposited on hard surfaces is likely to be breathed by humans if it is re-distributed into the atmosphere. The hard surface may be a floor, in particular a wooden floor, or may be furniture placed within a room. The furniture may be of any of the materials commonly used for the construction of furniture, e.g. wood, plastics, glass.

According to a further aspect of the present invention, a process for treating a hard surface in a room comprises
 a) applying to the surface an emulsion polish comprising a non-volatile silicone fluid, a liquid polyether siloxane which is immiscible with water and the silicone oil, and a surfactant to stabilize the emulsion wherein the polyether siloxane has a density which is less than that of the silicone fluid, and
 b) wiping the surface to break the emulsion.

The non-volatile silicone fluid is a hydrophobic liquid material based on a siloxane chain carrying alkyl substituents, preferably dimethyl, on the silicon atoms. Silicone fluids are well known commercial materials. It is preferred to use silicone fluids having a viscosity of at least 20 centistokes, preferably at least 80 centistokes, at 25° C., in order to maintain an even shine and significant residual film. However, it is preferred to avoid the use of silicone fluids with viscosities greater than 200 centistokes, as this will increase the time taken for particles to penetrate into the film of product deposited on the hard surface. For effective performance, an effective amount of the silicone fluid should remain on the treated surface for at least 24 hours. Preferably an effective amount should remain on the surface for at least one week, on the assumption that a fresh layer of product will be deposited at weekly intervals.

It is possible to produce volatile liquids based on dimethyl siloxane groups, usually with cyclic structures. Such volatile materials which rapidly evaporate from the layer deposited on the treated surface are not silicone fluids as required by the present invention.

Polyether siloxanes are known materials containing both polyether chains (derived from ethylene oxide or propylene oxide and chains of repeating dialkyl siloxane units).

The polyether siloxane is not miscible with either water or the siloxane fluid. This does not exclude the possibility of limited solubility in either water or the siloxane fluid but means that in the composition of the invention, the quantities of the siloxane fluid, polyether siloxane copolymer, and water are such that separate phases of each are formed when the components are allowed to settle in the absence of an added surfactant.

Many, if not most, siloxane-polyether copolymers are water-miscible and such copolymers are not suitable for use in the present invention.

Siloxane-polyether copolymers are available with various densities and it is an essential feature of the invention that the density of the polyether siloxane is less than that of the silicone fluid at ambient temperatures. Thus the density is preferably not more than 0.95 g/ml, preferably not more than 0.94 g/ml (at 25° C.).

Among commercially available polyether siloxanes are those with the following structures Structure 1

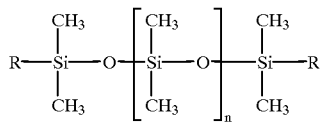

Structure 2

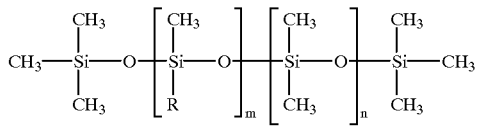

where R is a polyether group.

If polyether siloxanes of structure 1 are available having the required miscibility and density requirements they may be used in the present invention. It is preferred to use polyether siloxanes of structure 2, in particular those in which the siloxane structure has been modified by replacing some of the methyl groups by higher alkyl groups in addition to polyether groups. Thus the preferred polyether siloxanes are those containing pendent polyether groups on at least some of the Si atoms linked to two oxygen atoms in the backbone of the polymer, as well as alkyl groups.

An example of a particularly preferred polyether siloxane is that available from Th. Goldschmidt AG under the trade name "Tegopren 7006".

Many polyether siloxanes have activity as surfactants. However, the polyether siloxanes used in the present invention are not required to provide surfactant activity but to modify the behaviour of dust on the surface. The surface activity required to form an emulsion is provided by surfactant materials other than polyether siloxanes meeting the miscibility and density requirements of the present invention. Conventional surfactants which do not contain silicon are well-known and may be used in the present invention. It is preferred to use a mixture of oil-soluble and water-soluble surfactants. Examples of surfactants which may be used are sorbitan monooleate (oil-soluble) and alkylene oxide derivatives of sorbitan monooleate (water-soluble).

The composition may contain various other components which are conventional in furniture polishes, for example hydrocarbon solvents, wax, preservative, corrosion inhibitors, anti-static agents, and fragrance.

The compositions of the present invention may be used in the form of emulsions with an oil phase dispersed in a continuous aqueous phase (which may be referred to as "water out" emulsions, or as emulsions in which water droplets are dispersed in a continuous oil phase (which may be referred to as "oil out" emulsions).

The emulsions are preferably prepared by separately preparing a) an oil phase containing oil-soluble components including an oil-soluble surfactant, and b) an aqueous phase containing water-soluble components including a water-soluble surfactant, and then mixing the phases together in conventional homogenizing equipment for producing emulsions.

The composition may be used as a cream, in which case wiping to break the emulsion is simultaneous with the application of the cream. Alternatively, the composition may be applied to a surface in the form of a spray, and subsequently wiped over the surface. The spray may be applied using a dispenser with a hand operated pump, or a may be applied using gas stored under pressure from an aerosol dispenser.

The amount of the siloxane fluid in the composition may for example be 0.5 to 20% by weight, based on the total weight of composition, preferably 1 to 5% by weight.

The amount of polyether siloxane may for example be in the range 0.2 to 5% by weight, based on total weight of composition, preferably 0.3% to 1.5% by weight.

The amount of surfactant may for example be in the range 0.2 to 4% by weight based on the weight of composition, preferably 0.3% to 2% by weight.

The amount of hydrocarbon solvent may for example be 5% to 50% by weight, based on total weight of composition, preferably 10% to 15% by weight.

The quantity of water is preferably at least 50% by weight based on total weight of composition, preferably at least 70% by weight.

BEST MODE OF CARRYING OUT THE INVENTION

Comparative Test A

This is a Comparative Test showing an an oil-in-water emulsion not according to the invention.

An aqueous phase is prepared containing water-soluble ingredients, namely a corrosion inhibitor, a preservative, and a water-soluble emulsifier. An oil phase is prepared containing an aliphatic solvent, a silicone fluid, an oil-soluble emulsifier, and a fragrance, but not a polyether siloxane.

The emulsion is formed by adding the oil phase to the water phase and homogenized by passing the two phases through a shear plate in a conventional homogenizer at a pressure of 3000 psig (pounds per square inch gauge) (20.7 MPa).

The composition of the resulting oil-in-water emulsion is given in Table 1.

EXAMPLES 1–3

Compositions are prepared as in Example 1 but with a polyether siloxane present and with changes in some of the other ingredients used. The compositions are given in Table 1.

Surfactant 1 (oil-soluble) listed in Table 1 is sorbitan monoleate, commercially available under the trade name Span 80.

Surfactant 2 (water-soluble) is an ethoxylated derivative of sorbitan monoleate containing 20 ethoxy units per molecule, and commercially available under the trade name Tween 80.

The silicone fluid is a liquid polydimethyl silicone commercially available from Dow Corning under the designation Fluid 200 and described by the supplier as having a viscosity of 100 cst and a specific gravity of 0.96.

Surfactant 3 (water-soluble) is sodium lauroyl sarcosinate, commercially available under the trade name Crodasinic LS30.

The polyether siloxane was a liquid polyether-alkyl-polydimethyl siloxane copolymer commercially available from Th, Goldschmidt AG under the trade name Tegopren 7006. This is stated by the supplier to be insoluble in water and alcohol at 25° C., to have a density of 0.92–0.94 g/ml and a viscosity of 700–1100 mPa s, both at 25° C.

The aliphatic solvent is a solvent commercially available from Exxon under the trade name Exxsol D145/160.

The corrosion inhibitor is sodium alkenyl sulphosuccinic acid commercially available under the trade name Rewocor B3010.

The preservative is 2-bromo-2-nitropropane-1,3-diol, commercially available under the trade name Bronopol.

The emulsions described in Test A and Examples 1 to 3 may be delivered to a surface to be cleaned and polished as a spray from a trigger spray unit (which incorporates a pump operated by the trigger), or may be applied directly as a liquid. It is particularly suitable for delivery from an aerosol dispenser by a propellant gas which may be stored within the dispenser as a gas or as a liquid which is a gas at atmospheric pressure. If using a liquefied hydrocarbon propellant, the dispenser would contain 85%–95% by weight of the emulsion and 15%–5% by weight of the propellant. If using compressed air or other non-flammable materials which are stored in the dispenser in gaseous form, then the dispenser may contain 99.2% of emulsion and 0.8% of compressed gas at a pressure of 9–11 bar.

EXAMPLE 4

This is an example of a composition in accordance with the invention in the form of an oil-in-water emulsion.

The emulsion is prepared from an aqueous phase and an oil phase. The oil phase contains wax and is therefore heated to melt the wax. The aqueous phase is homogenized and heated to about 80° C. It is then added to the hot (80° C.), homogenized, oil phase and mechanically homogenized with high shear. The emulsion is cooled as quickly as possible to 20° C.

The composition of the emulsion is given in Table 2.

The components identified in the same way as in Table 1 are the same as in Table 1. Components not used in the experiments reported in Table 1 are: isoparaffin solvent, which is commercially available from Exxon as Exxsol D 100/120; and wax, which was a refined paraffin wax supplied as commericially as "132/134 mp" grade (where the numbers refer to the melting point in Fahrenheit).

The emulsion of Example 4 may be used in the same way as in the preceding experiments.

TABLE 1

| Ingredient | Experiment A | Experiment 1 | Experiment 3 |
|---|---|---|---|
| Water | to 100% | to 100% | to 100% |
| Surfactant 1 | 0.30 | 0.30 | 0.30 |
| Surfactant 2 | 0.30 | 0.30 | 0.30 |
| Silicone Fluid | 2.00 | 2.00 | 2.00 |
| Surfactant 3 | — | — | 0.20 |
| Polyether siloxane | — | 0.25 | 0.25 |
| Aliphatic solvent | 10.00 | 10.00 | 10.00 |
| Corrosion inhibitor | 0.30 | 0.30 | 0.30 |
| Preservative | 0.02 | 0.02 | 0.02 |
| Fragrance | 0.30 | 0.30 | 0.30 |

TABLE 2

| Ingredient | Experiment 4 % by weight |
|---|---|
| Water | to 100% |
| Surfactant 1 | 0.30 |
| Surfactant 2 | 0.30 |
| Silicone fluid | 2.00 |
| Polyether siloxane | 0.50 |
| Isoparaffin solvent | 20.00 |
| Wax | 0.50 |
| Preservative | 0.02 |
| Fragrance | 0.30 |

Evaluation of Behaviour of Dust on Surfaces Coated With the Compositions

Three different liquid compositions, corresponding to those of Test A, Example 1 and Example 3, were introduced into the three compartments of a three-cell petri dish. The amount used was 5 g in each compartment. The petri dish was set up on a light box with a video camera directly overhead pointing down. Five sheets of standard A4 photocopy paper were placed on the light box below the dish to reduce the intensity of the light from the light box passing through the petri dish.

Additional lighting was supplied by overhead strip lights. The light box removed any shadow from the overhead strip lights. The video camera was linked to an "Apple Macintosh"™ computer with commercially available image processing software Image 4.1 and set up so that it captured a full frame image of the petri dish.

House dust was sieved through a 250 micrometre mesh. A portion (50 g) of the sieved house dust was evenly placed on a sieve having a diameter of 100 mm and a mesh size of 106 micrometres. The sieve was placed directly over the petri dish and shaken for 5 seconds to distribute a thin even layer of dust on to the surface of the dish. Immediately, the sieve was was removed, an image was captured, and a stop clock was started. The image was enhanced using the "sharpen" feature in the software. An image was captured after 20 minutes and enhanced as before.

Comparison of the initial image and the image after 20 minutes showed that with the composition of Test A, the dust spread out over the surface. The dust remained on the surface and was not wetted by the liquid. The dust on the composition of Example 1 remained on the surface but was seen to be wetted by the liquid, forming a floating layer at the top of the liquid but within the surface of the liquid itself. The dust also showed movement resulting in the formation of discrete agglomerations on the surface. Similar results were obtained for the liquid of Example 3. The presence of an additional surfactant in the liquid of Example 3 slightly improved the wetting of the dust but did not increase the amount of agglomeration.

What is claimed is:

1. An emulsion polish comprising:
    a non-volatile silicone fluid having a viscosity of not more than 200 centistokes at 250° C.;

a liquid polyether siloxane which is immiscible with either water or the silicone fluid, the polyether siloxane having a specific gravity which is less than that of the silicone fluid; and a surfactant to stabilize the emulsion.

2. A polish according to claim 1 wherein the silicone fluid has a viscosity of at least 20 centistokes at 25° C.

3. A polish according to claim 1 wherein the density of the polyether siloxane is not more than 0.95 g/ml at 25° C.

4. A polish according to claim 1 wherein the polyether siloxane contains pendent polyether groups linked to at least some of the Si atoms linked to two oxygen atoms in the backbone of the polymer.

5. A polish according to claim 1 which is in the form of an oil-in-water emulsion.

6. A polish according to claim 1 which contains 0.5% to 20% by weight of silicone fluid based on the weight of the polish.

7. A polish according to claim 1 wherein the amount of polyether siloxane is in the range of 0.2% to 2% by weight based on total weight of the polish.

8. A polish according to claim 1 wherein the amount of surfactant is in the range of 0.2% to 4% by weight based on total weight of the polish.

9. An emulsion polish comprising:

a non-volatile silicone fluid;

a liquid polyether siloxane which is immiscible with either water or the silicone fluid, the polyether siloxane having a specific gravity which is less than that of the silicone fluid, and the amount of polyether siloxane being in the range of 0.2% to 2% by weight based on total weight of the polish; and a surfactant to stabilize the emulsion, wherein the polish is in the form of an oil-in-water emulsion.

10. A polish according to claim 9 wherein the silicone fluid has a viscosity of at least 20 centistokes at 25° C.

11. A polish according to claim 9 wherein the silicone fluid has a viscosity of not more than 200 centistokes at 25° C.

12. A polish according to claim 9 wherein the density of the polyether siloxane is not more than 0.95 g/ml at 25° C.

13. A polish according to claim 9 wherein the polyether siloxane contains pendent polyether groups linked to at least some of the Si atoms linked to two oxygen atoms in the backbone of the polymer.

14. A polish according to claim 9 which contains 0.5% to 20% by weight of silicone fluid based on the weight of the polish.

15. A polish according to claim 9 wherein the amount of surfactant is in the range of 0.2% to 4% by weight based on total weight of the polish.

16. An emulsion polish comprising:

a non-volatile silicone fluid, the amount of silicone fluid being in the range of 0.5% to 20% by weight based on total weight of the polish;

a liquid polyether siloxane which is immiscible with either water or the silicone fluid, the polyether siloxane having a specific gravity which is less than that of the silicone fluid, and the amount of polyether siloxane being in the range of 0.2% to 2% by weight based on total weight of the polish; and a surfactant to stabilize the emulsion.

17. A process for treating a hard surface in a room, the process comprising the steps of:

applying to the surface an emulsion polish according to claim 1 or claim 9 or claim 16; and wiping the surface to break the emulsion.

18. A polish according to claim 16 wherein the silicone fluid has a viscosity of not more than 200 centistokes at 25° C.

19. A polish according to claim 16 wherein the polyether siloxane contains pendent polyether groups linked to at least some of the Si atoms linked to two oxygen atoms in the backbone of the polymer.

20. A polish according to claim 16 wherein the amount of surfactant is in the range of 0.2% to 4% by weight based on total weight of the polish.

* * * * *

UNITED STATES PATENT AND TRADEMARK OFFICE
CERTIFICATE OF CORRECTION

PATENT NO. : 6,352,582 B1
DATED : March 5, 2002
INVENTOR(S) : Colin W. Brown

It is certified that error appears in the above-identified patent and that said Letters Patent is hereby corrected as shown below:

Column 6,
Line 67, "250°" should read -- 25° --.

Signed and Sealed this

Fourteenth Day of October, 2003

JAMES E. ROGAN
*Director of the United States Patent and Trademark Office*